P. WHITE.
ROLL FOR DELINTING COTTON SEED OR THE LIKE.
APPLICATION FILED JAN. 17, 1908.

986,415.

Patented Mar. 7, 1911.

2 SHEETS—SHEET 1.

WITNESSES:
L. L. Mead
W. A. Alexander.

INVENTOR
Peter White
BY
ATTORNEYS

UNITED STATES PATENT OFFICE.

PETER WHITE, OF ST. LOUIS, MISSOURI.

ROLL FOR DELINTING COTTON-SEED OR THE LIKE.

986,415.            Specification of Letters Patent.        Patented Mar. 7, 1911.

Application filed January 17, 1908. Serial No. 411,269.

*To all whom it may concern:*

Be it known that I, PETER WHITE, a citizen of the United States, residing at St. Louis, in the State of Missouri, have invented a certain new and useful Roll for Delinting Cotton-Seed or the Like, of which the following is such a full, clear, and exact description as will enable any one skilled in the art to which it appertains to make and use the same, reference being had to the accompanying drawings, forming part of this specification.

Rolls for delinting cotton seed or the like have heretofore been used, in which the entire periphery of the roll has been composed of a single piece of steel, cut into suitable teeth, for engaging with the lint. These rolls on account of their great length and diameter have been formed of soft steel because it was practically impossible to harden the roll without warping or cracking it. Owing to the fact of its being made of soft steel, the teeth have remained sharp but a short time so that the roll required to be ground or replaced with a new one at short intervals. In addition to this objection of the former rolls, if a portion of the roll became damaged by contact with a hard foreign substance in the cotton, the entire roll was lost.

The object of the present invention is to provide a roll the periphery of which is built up of numerous small sections which can be hardened to any desired degree, and one of which may be replaced by a new section in case it becomes damaged.

Another object of my invention is to so construct the sections that a portion of them are reversible, so that the roll may be partially renewed without the use of any new segments.

Figure 1:
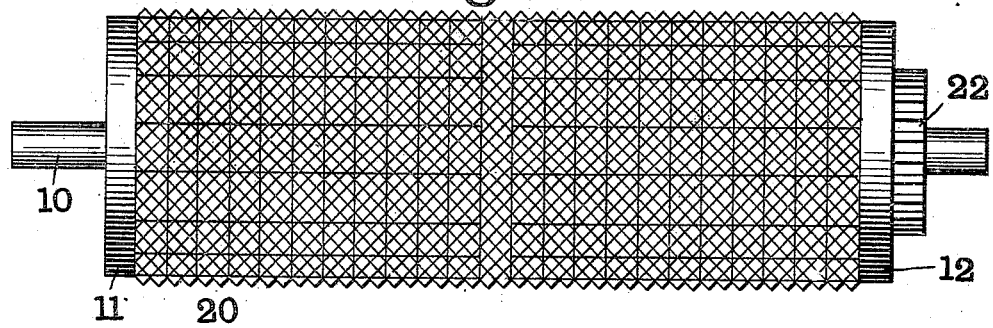
Figure 2:
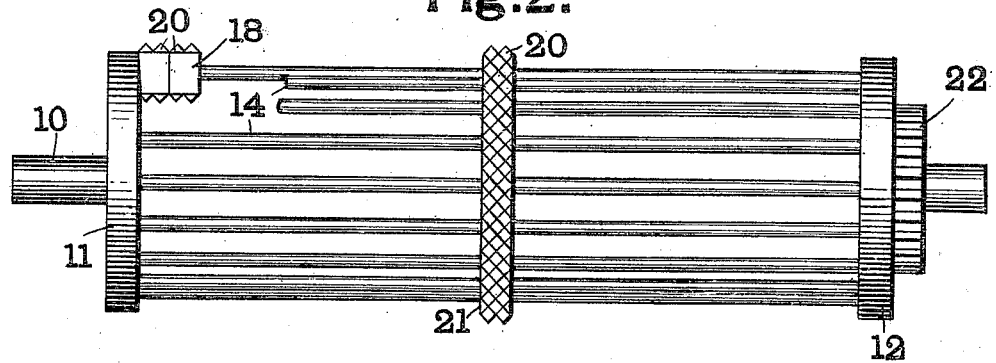
Figure 3:
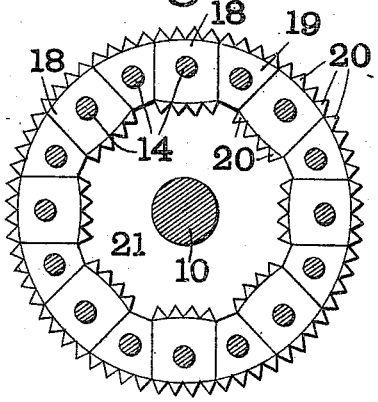
Figure 4:
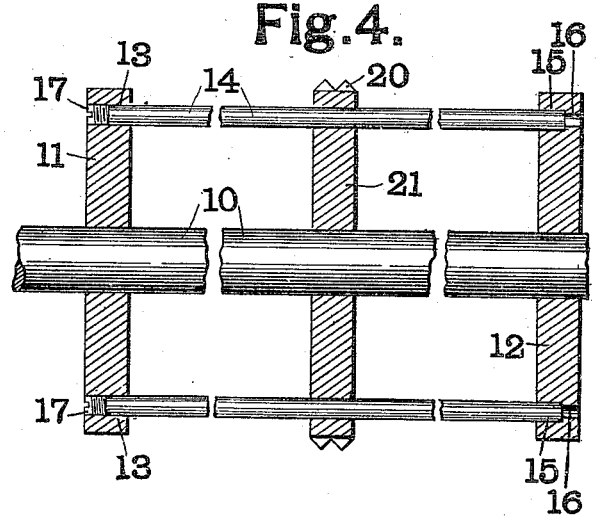
Figure 5:
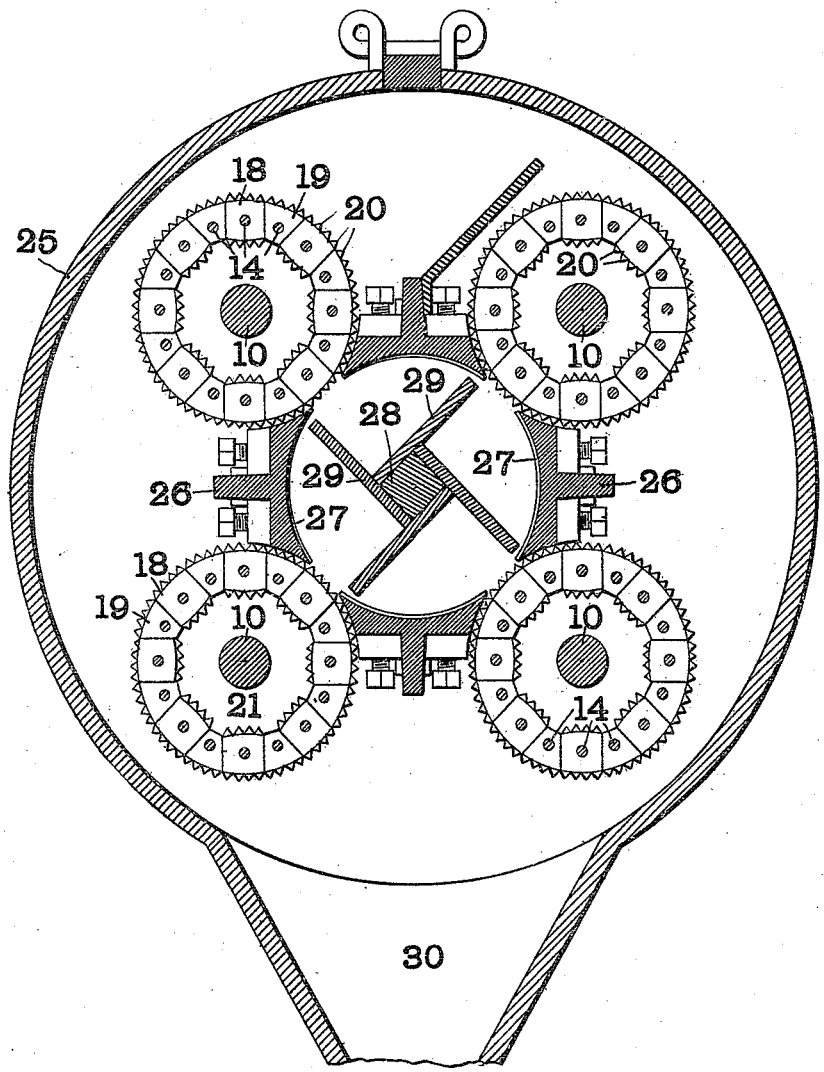

In the accompanying drawings which illustrate a roll made in accordance with my invention, together with a portion of one form of delinting machine in which they may be used, Figure 1 is a side elevation of a building roll, Fig. 2 is a side elevation of the frame upon which the roll is built, Fig. 3 is a cross-section of the roll, Fig. 4 is a longitudinal section of the frame, and Fig. 5 is a cross-section of one form of delinting machine in which the roll may be used.

Like marks of reference refer to similar parts in the several views of the drawings.

10 is the shaft of the roll. Upon this shaft 10 are rigidly secured two disks 11 and 12, respectively, forming the end members of the roll. In the disk 11 are formed openings 13 through which pass rods 14, preferably circular in cross-section. The end of these rods 14 enter openings 15 in the disk 12. These openings 15, however, extend only partially through the disk 12, and communicate with smaller openings 16 so as to form a seat for the ends of the rods 14. The rods 14 are held in position by means of screw plugs 17 entering the openings 13 in the disk 11. Upon the rods 14 are arranged the sections of which the roll is composed. These sections are of two forms. One of these forms of section 18 has its abutting sides parallel, while the other 19, has its abutting sides arranged converging, so that the section is wedge-shaped. These two forms of sections are alternately arranged on the rods 14, as best shown in Figs. 3 and 5. Teeth 20 are formed on the outer faces of both forms of section, and such teeth 20 are also formed on the inner face of the sections 18. Such inner faces are curved on the same radius as the outer faces of the sections, so that these sections 18 may be reversed in case the outer side becomes worn or damaged. In order to prevent the rods 14 from springing outward, under the centrifugal force generated by the rotation of the roll, I employ one or more disks 21, which are applied loosely over the shaft 10 and the rods 14. This disk, 21, is provided with teeth 20 like the sections 18 and 19 and is of a proper diameter to be flush with the remainder of the completed roll.

22 represents a gear-wheel which may be secured adjacent to one of the heads of the roll for driving the roll.

In Fig. 5 I have shown one form of machine in which my roll may be used, although I do not desire to limit myself to the use of my roll in this form of machine.

In Fig. 5, 25 represents a casing, preferably circumferential in form, in which are journaled the shafts 10 of four of my rolls. Arranged between the rolls are concaves 26 which are provided with circumferential grooves 27, and between which is arranged a shaft 28, carrying blades 29. The cotton seed is fed into one end of the trough formed by the concaves 26, and is carried through the said drive by the combined action of the blades 29 and the grooves 27 in the concaves. Being repeatedly presented to the teeth 20 of the rolls, these teeth remove the lint from the seed, and the lint escapes from the machine through the outlet 30.

Owing to my manner of building up the roll with comparatively small sections, these sections may be made of tool steel, and tempered to any required degree of hardness. Owing to this the teeth 20 will not readily become dulled, as in the case of a soft steel roll. Moreover, in case injury occurs to the teeth of any particular section, this section may be removed by partially withdrawing one of the rods 14. This may be accomplished by unscrewing the plug 17 and inserting any suitable instruments through the opening 16 against the end of the rod 14. The section may now be replaced by a new one, or in case it is one of the parallel sides of section 18, the section may be reversed, bringing the teeth which were formerly on the interior of the cylinder into play.

Having now fully described my invention, what I claim as new and desire to secure by Letters Patent of the United States is:

1. A roll for delinting cotton seed or the like having its periphery composed of removable sections, a portion of said sections being reversible and toothed on both their interior and exterior faces.

2. A roll for delinting cotton seed or the like, having its periphery composed of alternate wedge-shaped and parallel sided sections, both of said forms of sections being toothed on their exterior faces and said parallel sided sections being toothed on their interior faces.

3. In a roll for delinting cotton seed or the like, the combination with the shaft of a pair of end members carried on said shaft, rods carried by said end members, and a plurality of separate toothed sections secured in position by said rods, a portion of said sections being reversible and having inner toothed faces.

4. In a roll for delinting cotton seed or the like, the combination with the shaft of a pair of end members carried by said shaft, rods carried by said end members, and a plurality of separable toothed sections carried by said rods, said toothed sections being alternately parallel-sided and wedge shaped, said parallel sided sections being reversible and having inner toothed faces.

5. In a roll for delinting cotton seed or the like, the combination with a shaft, of a pair of end disks rigidly secured to said shaft, toothed sections forming the periphery of said roll, rods extending between said end disks and securing said toothed sections, each of said rods engaging with an opening in one of said disks, each of said openings being provided with a shoulder forming a stop for one end of the rod, and threaded blocks in the other of said disks engaging the other ends of said rods to lock the same against longitudinal movement.

In testimony whereof I have hereunto set my hand and affixed my seal in the presence of the two subscribing witnesses.

PETER WHITE. [L. S.]

Witnesses:
W. A. ALEXANDER,
ELIZABETH BAILEY.

---

Copies of this patent may be obtained for five cents each, by addressing the "Commissioner of Patents, Washington, D. C."